United States Patent [19]
Fleury

[11] 3,802,453
[45] Apr. 9, 1974

[54] SERVO-VALVE RESPONSIVE TO SMALL CONTROL PRESSURE

[75] Inventor: Jacques Fleury, Paris, France

[73] Assignee: Societe Anonyme Automobiles Citroen, Paris, France

[22] Filed: Mar. 14, 1972

[21] Appl. No.: 234,499

[30] Foreign Application Priority Data
Mar. 17, 1971 France................71.09313

[52] U.S. Cl............................. 137/85, 137/625.69
[51] Int. Cl............................................ F15b 11/10
[58] Field of Search............ 137/85, 625.69, 625.64, 137/596.17, 102, 106; 91/370, 318

[56] References Cited
UNITED STATES PATENTS

| | | | |
|---|---|---|---|
| 3,592,211 | 7/1971 | Spalding | 137/625.64 |
| 2,911,991 | 11/1959 | Pearl | 137/85 |
| 3,454,026 | 7/1969 | Orme | 137/625.64 X |
| 2,298,457 | 10/1942 | Berges | 91/318 |
| 3,592,217 | 7/1971 | Keagle | 91/318 |

Primary Examiner—Alan Cohan
Attorney, Agent, or Firm—Brisebois & Kruger

[57] ABSTRACT

Servo-valve comprises a spool valve controlling the main pressure one end of which is subjected to a control pressure and the other end of which is subjected to a feedback pressure derived from the output pressure but diminished by a resilient counter-pressure.

8 Claims, 5 Drawing Figures

PRIOR ART

SERVO-VALVE RESPONSIVE TO SMALL CONTROL PRESSURE

SUMMARY OF THE INVENTION

This invention relates to a servo-valve for supplying fluid from a fluid source to an output duct at a pressure which is dependent upon a variable control force.

Servo-valves are known which comprise a sliding distributor member adapted to place an output duct in communication either with a source of fluid under pressure, or with an exhaust port; said member being subjected on the one hand to a control force and on the other hand to a feedback force opposing said control force and which is dependent upon the output pressure. This feedback pressure results from the direct application of the output pressure to a section of the distributor member to balance said control force.

In such servo-valves, the distributor member is usually a spool valve, the sliding parts of which must be made with the utmost precision. It is difficult to produce economically and with precision, sliding assemblies having a very small diameter. It follows that the section of application of the output pressure cannot be decreased at will. The control force, which is dependent upon this section, cannot therefore be as small as would be suitable for certain applications.

It is an object of the invention to permit a large output pressure to be obtained, which is responsive to a small control force, an electrical signal for example, and to enable this result to be obtained economically.

A servo-valve according to the invention is primarily characterized in that the feedback force is supplied through resilient means interposed between the end of the sliding distributor member opposite the end to which the control force is applied and a movable member, the position of which is dependent upon the output pressure.

Preferably the movable member is slidably mounted and is subjected at one end to the output pressure, which pressure is balanced by a spring bearing on a fixed abutment in the servo-valve. An additional resilient member bears on the end of the distributor member remote from the end to which the control force is applied.

Moreover the distributor member may be a spool valve and the movable member a piston coaxial therewith. The additional resilient member may be a helical spring which is also coaxial with the spool valve.

In order that the invention may be more clearly understood, a preferred embodiment thereof will now be described, with reference to the accompanying drawings, in which.

Figure 1:
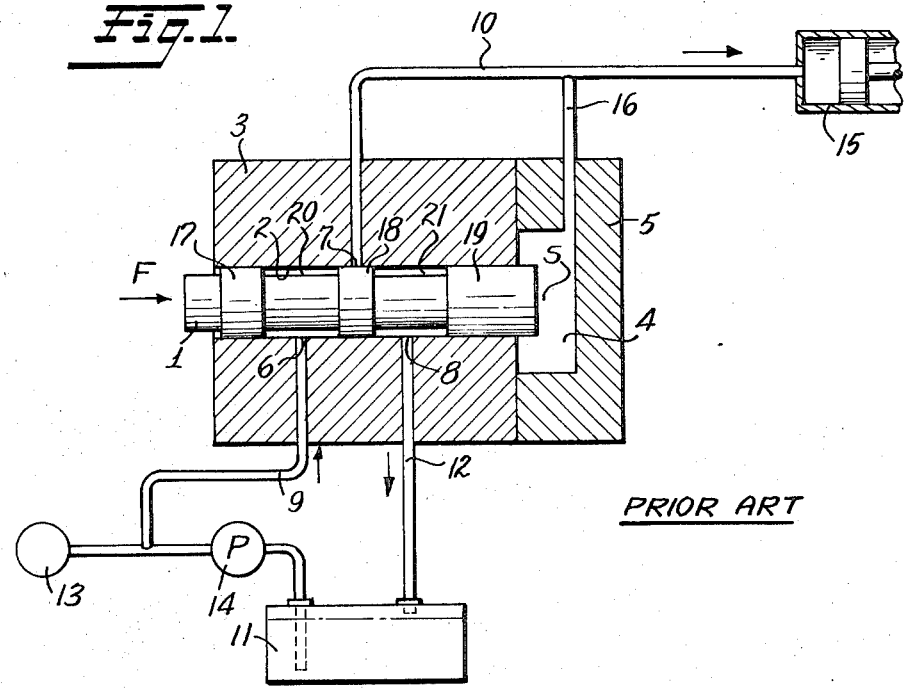
FIG. 1 is a schematic axial sectional view illustrating an arrangement using a conventional servo-valve.

Referring now to the drawings, the conventional device shown in FIG. 1, comprises a distributor having a valve spool 1. The spool 1 is subjected on the one hand to a control force F and, on the other hand, to a feedback force resulting from the direct application of the output pressure to the surface S corresponding to its section.

The valve spool 1 slides in a bore 2 of section S, machined in the body 3 of the distributor. This bore, which opens firstly in an outward direction and secondly into a chamber 4 in a cover 5 for the body 3, has three ports 6, 7 and 8 respectively connected to a pressure source by a duct 9, to an output circuit by a duct 10, and to an exhaust (the reservoir 11) by a duct 12.

The pressure source has been shown diagrammatically (on a reduced scale) as a hydraulic accumulator 13 supplied by a pump 14 maintaining a pressure P greater than the output pressure.

A jack 15 represents the operative load, and is connected to the distributor by the duct 10 which is itself connected to the chamber 4 by a duct 16.

The valve spool 1 has three cylindrical lands 17, 18 and 19 which define therebetween two annular grooves 20, 21 in permanent communication with the ducts 9 and 12 through the ports 6 and 8.

Depending on the position of the valve spool, the port 7 is either shut by the intermediate cylindrical land 18 or in partial or total communication either with the groove 20 or the groove 21.

When the spool valve is in equilibrium between the control force F and the feedback force resulting from the application of the output pressure OP in the chamber 4, a variation in one or the other of these forces causes a longitudinal movement of the valve spool tending to modify the ratio of the pressure differences between the duct 10 and the grooves 20, 21 (and thus the source of pressure and exhaust) in a direction which tends to re-establish the balance at which $F = OP \times S$.

Such a device necessitates extremely accurate machining of the valve spool 1 and bore 2, which is economically incompatible in mass production with the small section S which a low force F would require for a high pressure OP.

Figure 2:
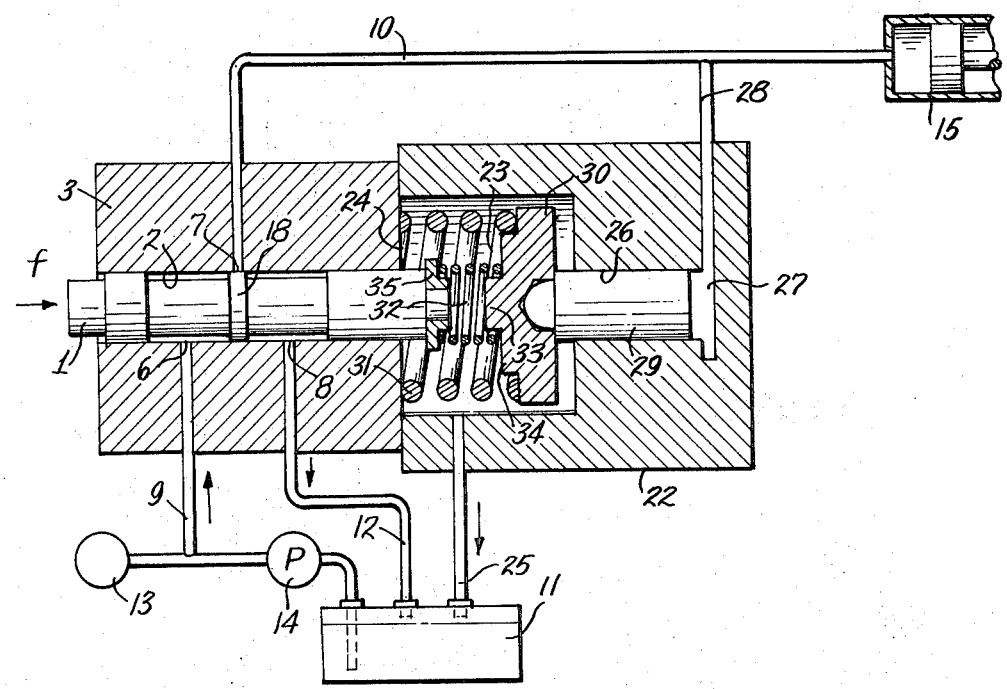
FIG. 2 shows, in axial section, a servo-valve according to one embodiment of the invention, and FIGS. 3 to 5 diagrammatically illustrate different positions reached during the operation of the servo-valve shown in FIG. 2.

In FIG. 2, showing a servo-valve according to the invention, the reference numerals of FIG. 1 have been applied to all identical or like elements.

The feedback force dependent upon the output pressure is applied to the end of the valve spool remote from the end to which the control force $f$ is applied through a force transforming device arranged in a second body 22 integral with or secured to the distributor body 3 and taking the place of the cover 5 of FIG. 1.

The bore 2 opens into a cylindrical chamber 23 in the body 22 closed at one end by the wall 24 of the body 3. The chamber 23 is in communication with the exhaust through a duct 25.

A bore 26 of substantially the same diameter and in axial alignment with the bore 2 is machined in the body 22 between the cylindrical chamber 23 and a pressure chamber 27 in the body 22. This chamber 27 communicates with the output circuit through a duct 28.

A piston 29 slides in the bore 26, one of its ends being subjected to the output pressure prevailing in pressure chamber 27 while its other end is subjected to the exhaust pressure in chamber 23.

In the chamber 23, the piston 29 bears on a slidable abutment 30 subjected to the action of at least two helical compression springs 31 and 32 which oppose the force resulting from the difference in pressure between the chamber 27 and the chamber 23.

The stiffness of the spring 31 is appreciably greater than that of the spring 32. The slidable abutment 30 is symmetrical about an axis of revolution and centered on the end of the piston 29. Its outer diameter provides radial clearance between it and the cylindrical wall of the chamber 23.

The springs 31 and 32 are concentric, their common axis being substantially aligned with the common axis of the bores 2 and 26. The spring 31 bears at one end against the stop 30, on which it is centered by a cylindrical boss 34, while its other end bears against the wall 24.

The spring 32 within the spring 31 bears at one end against the stop 30 on which it is centered by a cylindrical boss 33 while the other end bears against and is centered on a flange 35 on the valve spool 1.

The control force may be electrical in nature and applied through a torque motor or transducer means, with the control force thus being dependent on the magnitude of the electrical control signal applied to the torque motor or transducer means.

Figure 3:
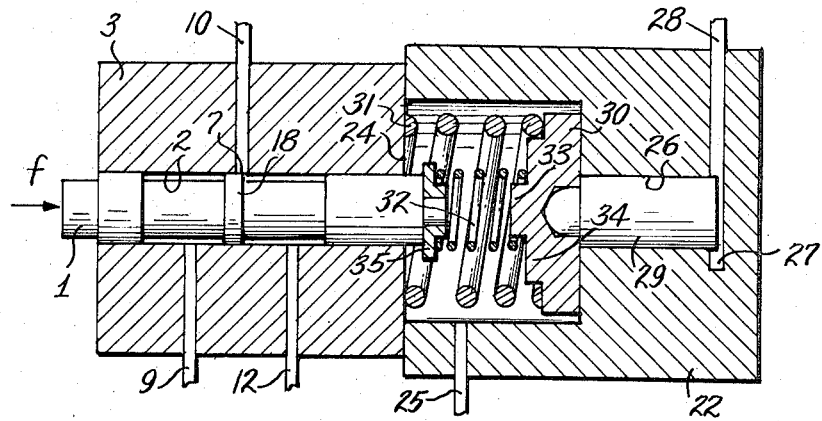
Figure 4:
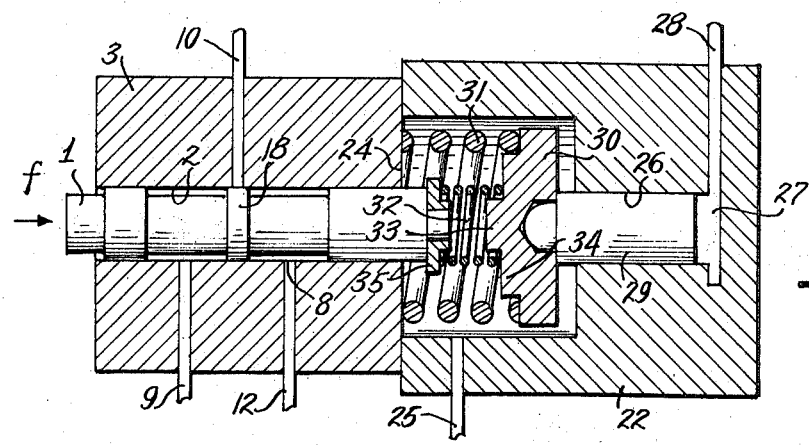
Figure 5:
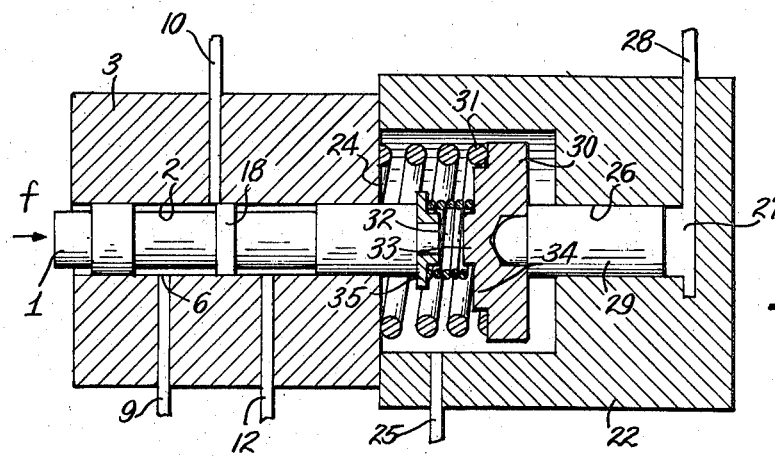

In the analysis of the operation which follows, the assembly comprising the piston 29 and the slidable abutment 3 shown in one piece on FIGS. 3 to 5 is referred to as the movable member.

FIG. 3 shows the positions of the movable member and the valve spool when the control force $f$ is zero and the balance is effected with OP equal to zero.

The movable member is topped towards the right of the cylindrical chamber 23, with the spring 31 at its maximum elongation corresponding to a substantially zero stress thereagainst.

The valve spool 1 is in a position such that the cylindrical land 18 is at the right hand edge of the port 7 which is thus barely in communication with the exhaust port 12.

The spring 32 may, in this position, be in a slightly prestressed condition balancing, at most, the friction forces on the valve spool.

If the control force $f$ increases from zero, by a minimum value $f_1$, the valve spool, which compresses the spring 32, will assume the position shown in FIG. 5 in which the edge of the land 18 nearest the supply port 9 comes opposite the output port 7 to permit an increase in pressure in the output circuit. Since $f$ continues to increase beyond this value $f_1$, the pressure OP will increase from zero, pressing the movable member back towards the left of the figure by compressing the spring 31.

If $f$ is kept constant, the movable member and the valve spool will assume a position of equilibrium corresponding to a pressure OP defined by the characteristics of the springs 31 and 32. For each of these positions of equilibrium (FIG. 4) the valve spool will have a position between that of FIG. 3 and that of FIG. 5 which shows the position of equilibrium for OP max = P, and where the land 18 is beginning to open the port 7 to the pressure supply P.

If $f$ increases from one of these equilibrium positions (FIG. 4), the valve spool is pushed towards the right of the figure, uncovering the port 7 (FIG. 5), and the pressure OP increases and pushes the movable member back towards the left, which draws the valve spool to a new equilibrium position.

If, from one of these positions, $f$ decreases, the reverse operation will take place.

If $f$ is held constant and the pressure OP drops (as a result, for example of a slight loss), the movable member is displaced towards the right of the figure entraining with it the valve spool (with the elongation of the spring 32 remaining constant with $f$ constant), as a result of which there is a new supply, then a return to equilibrium.

A servo-valve according to the invention thus enables a large output pressure to be made responsive to a small control force.

The valve spool and the bore in which it slides may be produced with a diameter sufficient to be both economical and accurate.

The piston of the movable member may be of the same diameter as the valve spool, or of greater diameter.

The manufacture of the assembly is simple and does not require very accurate alignment between the valve spool and the piston of the movable member.

Such a spool valve can be used primarily, but not exclusively, in the economical manufacture of hydraulic control systems.

If desired, the resilient members 31 and 32 may each be made of a plurality of helical springs permitting relationships between the control power and the output pressure which deviate from a substantially linear law.

What is claimed is:

1. In a servo-valve providing an output pressure having a predetermined relationship to a control force, said servo-valve comprising a distributor member mounted in a valve body having an input port, an output port and an exhaust port, said distributor member being mounted for sliding movement between a first position in which said output port is connected to said input port and a second piston in which said output port is connected to said exhaust port, means for applying to said distributor member a control force urging it to slide in one direction between said positions and means for applying to said distributor member a feedback force dependent on the pressure in said output port which urges said distributor member in the opposite direction, the improvement according to which said last-mentioned means comprises a movable member slidable toward and away from said distributor member, subjected at one end to the pressure in said outlet port and constantly urging said distributor member in said opposite direction in response to the difference between the pressures in said output and exhaust ports, a first spring mounted between said movable member and a stationary abutment in said body to partially counteract the force exerted on said movable member by said pressure difference and thereby decrease the force with which said movable member urges said distributor member in said opposite direction, and an additional spring positioned between one end of said distributor member and said movable member to transmit movement from said movable member to said distributor member, both of said springs being located in a single chamber.

2. A servo-valve as claimed in claim 1 in which the distributor member is a valve member sliding in a bore.

3. A servo-valve as claimed in claim 2, in which the movable member comprises a piston coaxial with the distributor member.

4. A servo-valve as claimed in claim 2 in which the spring acting on the valve member is helical and coaxial with the valve member.

5. A servo-valve as claimed in claim 1, in which the movable member and the springs are coaxial, the spring resting on the stationary abutment being of greater stiffness than the spring transmitting movement from the movable member to the distributor member.

6. A servo-valve as claimed in claim 2, in which the section of the movable member subjected to the output pressure is at least equal to that of the valve member.

7. A servo-valve as claimed in claim 1 in which the control force is supplied by an electrical signal.

8. A servo-valve as claimed in claim 2, in which the valve member has a cylindrical land which, according to the position of the valve member, progressively covers the output port, said land separating two annular grooves of the valve member, one of which is in permanent communication with the input port, and the other with the exhaust port.

* * * * *